United States Patent Office 3,376,307
Patented Apr. 2, 1968

3,376,307
AMINO ESTERS OF (2,3 or 4) PYRIDYL CARBAMIC ACID
Seymour Hyden, Spring Valley, and Godfrey Wilbert, Carmel, N.Y., assignors to Nepera Chemical Co., Inc.
No Drawing. Filed Oct. 29, 1964, Ser. No. 407,575
5 Claims. (Cl. 260—294.3)

ABSTRACT OF THE DISCLOSURE

A class of urethane derivatives of the formula:

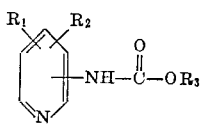

wherein $R_1$, $R_2$ and $R_3$ are as defined below. These compounds are useful as herbicides.

---

This invention relates to a composition of matter and more particularly to novel urethane derivatives having the formula:

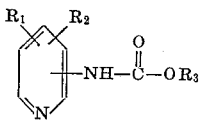

wherein $R_1$ may be hydrogen, lower alkyl such as methyl, ethyl, isopropyl and the like; halogen such as chloro or bromo; nitro; aryl such as phenyl; substituted aryl such as p-chlorophenyl, 3,4-dichlorophenyl, p-methoxyphenyl; or a heterocyclic radical such as furyl, pyridyl and the like, $R_2$ may be hydrogen, lower alkyl; aryl such as phenyl; alkenyl such as vinyl; aralkyl such as tolyl; haloalkyl; alkoyl; and aroyl such as benzoyl, and $R_3$ is a heterocyclic radical such as furyl, pyridyl, pyrimidyl, imidazolyl, quinolyl, isoquinolyl, dibenzofuryl; or a heterocyclic radical substituted with 1, 2 or 3 lower alkyl groups; halo; or phenyl.

The above compounds are useful as insecticides, fungicides, and herbicides.

The compounds of this invention are prepared by reacting a pyridine isocyanate of the formula:

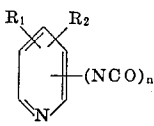

with an alcohol of the formula:

wherein $R_1$, $R_2$ and $R_3$ are as defined and $n$ is an integer of 1 to 3. The reaction is effected by contacting the starting materials at a temperature range of 0°–80° C. in a solvent system consisting of benzene, ether, chloroform and the like. The reaction product is recovered by addition of hexane to the reaction mixture and collected by filtration.

The starting isocyanates are prepared according to the process described in copending application "Pyridine Isocyanates," Ser. No. 407,574, filed Oct. 29, 1964, now abandoned.

The following examples are included in order further to illustrate the invention.

Example 1.—O-3-pyridylmethyl-N-3-pyridylcarbamate

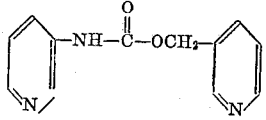

A solution of 5 grams of pyridine-3-isocyanate in about 50 cc. of benzene is added to a solution of 5 grams of pyridine-3-carbinol in 50 cc. of benzene at 0° C. and the mixture is warmed slowly to an ambient temperature of 20° to 30° C. and allowed to stand for 24 hours. Hexane is added to the mixture; the precipitated O-3-pyridyl-methyl-N-3-pyridylcarbamate then being collected by filtration and the initial product is recrystallized from benzene-hexane to yield 5.7 grams of a white solid, M.P. 148°–149° C. The infra-red spectrum features a band at 1720 cm.$^{-1}$. (C=O).

Example 2.—O-(N-methyl-3-piperidyl)-N-3-pyridylcarbamate

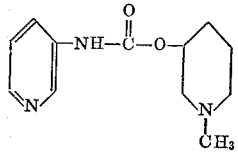

A solution of 1.2 grams of N-methyl-3-piperidinol in about 50 cc. of chloroform is added to a solution of 1.2 grams of pyridine-3-isocyanate in 50 cc. of chloroform and the mixture is warmed on the steam bath for 30 minutes. The chloroform is removed by distillation to afford a residual viscous liquid that solidifies upon cooling. The precipitated O-(N-methyl - 3 - piperidyl) - N - 3 - pyridyl-carbamate is recrystallized from benzene-hexane to yield 1.2 grams of a white solid, M.P. 78°–81° C. The infra-red spectrum features a band at 1710 cm.$^{-1}$. (C=O).

Example 3.—O-2-(β)-pyridylethyl-N-3-pyridylcarbamate

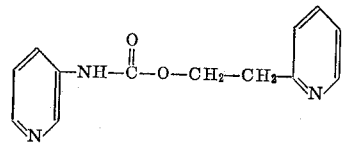

A solution of 1 gram of pyridine-2-ethanol in 50 cc. of benzene is added to a solution of 1 gram of pyridine-3-isocyanate in 50 cc. of benzene and the mixture is heated on the steam bath for 30 minutes. The reaction is cooled to an ambient temperature of 20° to 30° C. and upon addition of hexane, O-2-(β)-pyridylethyl-N-3-pyridyl-carbamate precipitates. The carbamate is recrystallized from benzene-hexane to yield 1.7 grams of a white solid, M.P. 121°–123° C. The infra-red spectrum features a band at 1710 cm.$^{-1}$. (C=O).

Example 4.—O-3-pyridyl-N-3-pyridylcarbamate

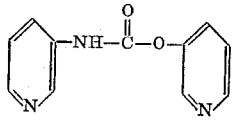

A suspension of 1 gram of 3-hydroxypyridine in 50 cc. of benzene is added to a solution of 1 gram of pyridine-3-isocyanate in 50 cc. of benzene and the mixture is heated on the steam bath for 30 minutes. The reaction mixture is cooled in an ice water bath and the O-3-pyridyl-N-3-pyridylcarbamate that precipitates is collected by filtration. The carbamate is recrystallized from benzene to yield 1.6 grams of a white solid, M.P. 148°–150.5° C. The infra-red spectrum features a band at 1735 cm.$^{-1}$. (C=O).

It is understood that the foregoing detailed description is given merely by way of illustration and that many variations may be made therein without departing from the spirit of our invention.

Having described our invention, what we desire to secure by Letters Patent is:

1. A compound of the formula:

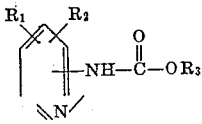

wherein $R_1$ is hydrogen, phenyl, or lower alkyl, $R_2$ is hydrogen, phenyl, or lower alkyl, and $R_3$ is pyridyl, piperidyl, pyridyl lower alkyl, piperidyl lower alkyl, or N-lower alkyl piperidyl.

2. O-3-pyridylmethyl-N-3-pyridylcarbamate.
3. O-(N-methyl-3-piperidyl)-N-3-pyridylcarbamate.
4. O-2-($\beta$)-pyridylethyl-N-3-pyridylcarbamate.
5. O-3-pyridyl-N-3-pyridylcarbamate.

References Cited

UNITED STATES PATENTS

| | | | |
|---|---|---|---|
| 2,772,276 | 11/1956 | Cusic | 260—294.3 |
| 2,914,533 | 11/1959 | Clinton | 260—294.3 |
| 3,249,619 | 5/1966 | Johnston | 260—295 |

JOHN D. RANDOLPH, *Primary Examiner.*

A. D. SPEVACK, *Assistant Examiner.*